INVENTOR.
STEFAN A. OCHS
BY L. A. Larsen
ATTORNEY

United States Patent Office 3,202,854
Patented Aug. 24, 1965

3,202,854
PICKUP TUBE TARGET HAVING AN ADDITIVE THEREIN FOR REDUCED RESISTIVITY

Stefan Albert Ochs, Princeton, N.J., assignor to Radio Corporation of America, a corporation of Delaware Filed Feb. 21, 1961, Ser. No. 90,749
4 Claims. (Cl. 313—65)

This invention relates to an improved photoemissive type device. In particular, this invention relates to an improved target electrode assembly for use in a photoemissive type pickup tube or camera tube.

In the prior art, there are certain photoemissive type camera tubes that are commercially available and are known as image orthicon tubes. The image orthicon tube comprises an evacuated envelope having a photoemissive cathode in one end thereof. The photoemissive cathode is exposed to light from a scene to be reproduced and emits a photoelectron image in proportion to this light. The photoelectron image is directed onto a semiconducting storage target and an image is stored thereon. The opposite side of the target is scanned by an electron beam which reads out the signals that are stored on the target. As the beam reads out the stored signal, it produces output signals from the tube.

In the image orthicon type camera tube, the semiconducting storage target must have certain characteristics in order for the tube to efficiently operate with presently used scanning rates and light levels. One of these characteristics is that, for conventional television scanning rates and signal levels, the resistivity of the target should be approximately $10^{11}$ ohm-cm. For other television scanning rates, for example PPI scanning rates, other target resistivities are preferably used.

Another characteristic of the target in an image orthicon type tube is that the target must be thermally stable and chemically inactive when exposed to the materials that are conventionally used for the photoemissive cathode. As an example, of a deficiency in this respect, there are certain chemicals which are used in the known and highly sensitive multi-alkali photoemitter, described in U.S. Patent No. 2,770,561 to Sommer, which chemically react with some of the known image orthicon target materials. Because of this chemical reaction, this highly efficient photoemitter can not be efficiently used with the conventional image orthicon target materials.

Another highly desirable characteristic of a target for an image orthicon type camera tube is that the target should be capable of operation for a relatively long period of time without changing any of its electrical characteristics. Some of the known target materials conduct a charge through the target, by means of a conduction which is ionic in nature. These materials have been found to have an irreversible change in conductivity with use because, it is believed, of a depletion of the available conducting ions. Once the conductivity has changed more than a predetermined amount, the tube must be replaced.

It is therefore an object of this invention to provide an improved target electrode structure for use in an image orthicon type pickup tube.

It is a further object of this invention to provide a novel method of and means for adjusting the resistivity in an improved image orthicon target structure.

It is a still further object of this invention to provide an improved photoemissive type camera tube.

These and other objects are accomplished in accordance with this invention by providing a novel image orthicon in which an improved long life target electrode structure is made of a thin film which includes a material of relatively high electrical resistivity such as magnesium oxide, aluminum oxide, or both, and in which the resistivity of the thin film is adjusted to its desired value by the provision of one or more doping agents, such as gold, silver, aluminum, titanium, zinc, tin, lead, gallium, selenium, tellurium, germanium, silicon or carbon, or the oxides of one or more of these materials, within the target structure.

The invention will be more clearly understood by reference to the accompanying single sheet of drawings, wherein.

Figure 1:
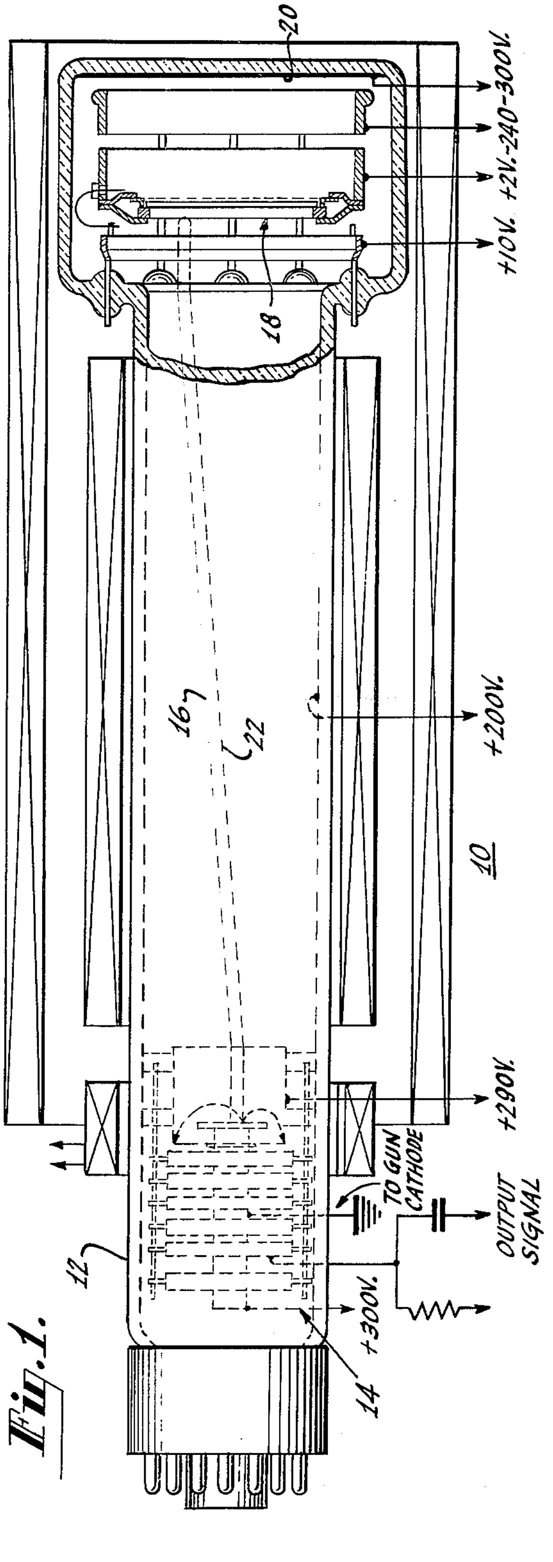
FIG. 1 is an elevational view partially broken away of an improved image orthicon tube made in accordance with this invention.

Referring now to FIG. 1, the image orthicon tube 10 comprises an evacuated envelope 12 having an electron gun 14 in one end thereof. The electron gun, which may be any conventional pickup tube gun design, produces an electron beam 16 that is directed, by means of conventional electrostatic and magnetic fields, toward the other end of the envelope 12. Within the other end of the envelope 12 there is provided a dielectric storage target 18 which will subsequently be described in detail.

On the inner surface of the said other end of the envelope 12 is a photoemissive cathode, or layer, 20 which may be any of the known photoemissive materials such as the commercially available S–11 surface, described in the U.S. Patent No. 2,676,282 to Polkosky, or the commercially available multi-alkali photoemissive surface described in U.S. Patent No. 2,770,561 to Sommer.

The photoelectrons emitted from the photocathode 20 are in proportion to the amount of light from a scene to be reproduced and are accelerated and land on, one side of the target 18. As this photoelectron image lands on the target 18, it establishes a charge image on the opposite side of the target 18 which corresponds to the original light image. The electron beam 16 scans, by means of conventional focusing coils, deflection yokes and alignment coils as shown, the charge image on the target 18. As the beam 16 scans the target 18, the beam erases the charge image and the balance of the primary electron beam is reflected back toward the electron gun 14 as a return electron beam 22. The return electron beam is passed through a conventional electron multiplier to produce an output signal from the tube.

Figure 2:
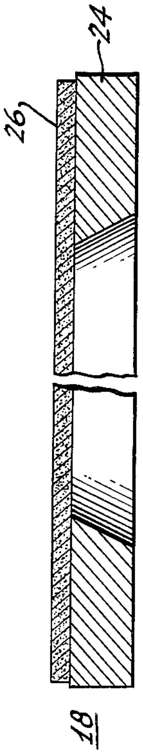
FIG. 2 is a greatly enlarged sectional view of the novel target structure shown in FIG. 2 and in accordance with this invention.

The tube 10 and its operation that have been described, are conventional except for the inclusion within the tube of a novel semi-conducting storage target 18 made in accordance with this invention. Referring now to FIG. 2, there is shown an enlarged, partially broken away, sectional view of the novel storage target 18. The target 18 comprises a support ring 24 having a thin membrane of semi-conducting material 26 stretched across the opening of the support ring 24.

In accordance with this invention, the membrane 26 comprises magnesium oxide, or aluminum oxide, or both, that has been "doped" with a selected amount of one or more materials so that the resistivity of the target membrane is at the required level that is necessary for operation under the presently used conditions of scanning rate, signal level etc. By doping is meant the addition of a suitable material which becomes a part of the thin magnesium oxide and/or aluminum oxide film. The doping material may become part of the crystalline and/or amorphous structure of the film or may be absorbed in the pores thereof. The material introduced during the doping process may, in some instances, be subsequently oxidized during the oxidation of the magnesium or aluminum.

As an example, an evaporated layer consisting principally of magnesium oxide is substantially chemically inert with respect to the conventional photoemissive materials. However, magnesium oxide is very insulating having a resistivity of the order of $10^{14}$ ohm-cm. or greater. This high resistivity limits the usefulness of pure magnesium oxide as an image orthicon target because the positive charge caused by the photoelectrons cannot completely flow to the scanned side of the target within a frame time. For example, where long storage times and very low light levels are employed, a pure magnesium oxide target is very useful. However, with conventional television scanning rates, and light levels, this high resistivity results in picture sticking.

A target 18 according to the invention, i.e., one having a resistivity of approximately $10^{11}$ ohm-cm., may be made as follows:

A substrate (not shown), e.g. nitro-cellulose, is formed on the support ring 24 by any conventional means, such as flotation filming. The support ring 24 is selected for its strength and for its substantially matching coefficient of expansion. One material for the support ring which has been found useful is molybdenum. The nitro-cellulose substrate, while on the ring, is placed in a vacuum chamber and on a support member (not shown), and the materials required for depositing the target are placed in one or more evaporator boats 28. The evaporator boat, or boats, are positioned at a distance of about 20 cm. from the substrate. During the evaporation process, a vacuum of better than $10^5$ mm. of Hg is preferred.

Figure 3:
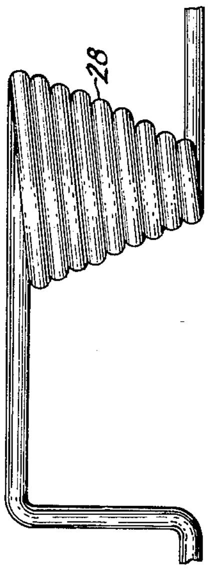
FIG. 3 is a side view of an evaporator unit for use during the manufacture of a target of the type shown in FIGS. 1 and 2.

Aluminum is first evaporated until the light transmission through the substrate and the deposited aluminum layer is approximately 80% of that of the original light transmission through the substrate. The monitoring light source may be any conventional visible source while the monitoring detector may be a phototube such as the 931A. Then, magnesium and silver are co-evaporated, from a single evaporator boat 28, until the light transmission is reduced to approximately 0.1% of the original transmission through the uncoated substrate. The ratio of silver to magnesium of the material, or alloy that is placed in the evaporator is selected so that the final target film will have the desired resistivity. The material, which is placed into the evaporator boat 28, one example of which is shown in FIG. 3, consists essentially of a mixture, to be subsequently described, of an alloy of 70% magnesium-30% aluminum and an alloy of 1.7% magnesium-98.3% silver. It is believed that, at the evaporator temperature used, only magnesium and silver are emitted from the evaporator boat. The amount of material that is placed in the evaporator boat 28 is several times the amount of material that is required to produce a target film. For example, 95 milligrams of the magnesium-aluminum alloy, with 5 milligrams of the magnesium-silver alloy, have been successfully evaporated, for a period of time of approximately two to three minutes, to make a film which is approximately 700 Angstrom units thick and 1½ inches in diameter. The evaporator boat 28 is heated to a temperature of approximately 600° C. to provide the desired evaporation. When a mixture of 95 milligrams of the magnesium-aluminum alloy and 5 milligrams of the magnesium-silver alloy were used, a layer of magnesium and silver was deposited which, after oxidation, had approximately the desired $10^{11}$ ohm-cm. resistivity. A film made with higher percentages of the magnesium-silver alloy will provide a target having lower resistivities.

Other methods of applying the silver "doped" magnesium may also be used. For example, co-evaporation of silver and magnesium, each element being evaporated from a separately controlled evaporator boat, can also produce films of suitable composition. Still further, evaporation of a thin film of silver, either before or after the magnesium is deposited, will produce the desired result, since the silver will diffuse throughout the thin magnesium film during the oxidation process or, if desired, during a separate additional heating process.

After the materials have been deposited, the target 18 is placed in an oven through which very dry, e.g. a dew point of approximately −70° C., oxygen is continuously flowing. An initial bake of approximately 20 minutes at approximately 200° C. will remove the nitro-cellulose substrate. Then, the temperature of the target is increased, in steps of approximately 10° C. per minute, up to a temperature range of from about 500° C. to about 550° C. Oxidation of the silver doped magnesium films begins to be noticeable, by the film becoming transparent, at about 400° C. and the film is completely oxidized near 500° C. The film is held in the 500–550° C. range for from 10 to 15 minutes and then allowed to cool slowly. About one hour is used for the heating cycle and about one hour for the cooling cycle. Extended oxidations, up to 18 hours, at a temperature of about 400° C. have also successfully been used. The magnesium silver-"doped" film is firmly attached to the support ring 24 by the oxidizing process and is ready for assembly to the conventional collector grid support ring and for insertion into the envelope 12.

When the doping material is introduced into the magnesium or aluminum film before the film is oxidized, the doping material may also become oxidized during the oxidation process. Since the oxidized form of the doping matter, e.g. silver oxide, has a much lower resistivity than the magnesium oxide or the aluminum oxide, the oxidized doping agent will also function to decrease the target resistivity. During standard tube processing, the photocathode 20 is usually cesiated. When this is done, the cesium will tend to reconvert an oxidized doping agent back to its original form, e.g. silver oxide to silver. Thus, it is not completely clear whether, in the completed tube, the doping agent, or its oxide, is present.

It should be understood that the "doping material" or doping agent that is introduced into the insulating film of magnesium oxide, or aluminum oxide, can be any suitable metal or semi-conductor.

The "doping material" can be evaporated or sputtered onto the otherwise finished, e.g. previously oxidized, thin film on one or both sides. The combination is then baked at a suitable temperature to cause diffusion of the doping material into the film. The term diffusion is meant to include both the situation wherein the doping material enters the pores of the insulating material and the situation wherein the doping material becomes a part of the lattice structure of the insulating material.

It is also believed that the doping material can be introduced into the oxide film electrolytically from the electrolyte solution used to anodize the metal. When the doping material is to be introduced electrolytically, the doping material should be present in the electrolyte as an ion. For example, positive germanium ions may be introduced into the ammonium nitrate solution that is used for anodizing an aluminum film by dissolving germanium oxide in the solution. During the anodization process, the positive ions are then incorporated into the aluminum oxide film. In this case the doping material would be ionized and its ion should be sufficiently small to move readily through the base material, i.e., the aluminum. Germanium is a suitable doping material because it forms a four-valent ion and its radius is 0.44 Angstrom unit which is smaller than that of the aluminum ion which is 0.57 Angstrom unit.

When the doping material is to be introduced by evaporation onto the thin film, followed by a bake, or by baking the film in a suitable atmosphere, then the doping material should have a sufficiently high diffusion rate in the film at temperatures to which the film can safely be exposed. One of the most readily diffused materials is silver. However, many others are suitable, such as gold, copper, aluminum, titanium, zinc, tin, lead, gallium, selenium, tellurium, germanium, silicon, and carbon. The choice of a doping material, of course, depends on the particular material or combination of materials used in the film. The doping material may go into the body of the film as an interstitial or a substitutional impurity or, in the case of polycrystalline materials, it may just enter the grain boundaries.

When the doping material is to be introduced as a part of the resistive film as the thin resistive film is formed, the doping material can be introduced as an alloying substance, e.g. aluminum oxide films were made from an aluminum-germanium alloy, or by co-evaporation, e.g. semi-conducting magnesium oxide films were made by co-evaporating magnesium and silver and then oxidizing.

What is claimed is:

1. A pickup tube comprising an evacuated envelope having an electron gun in one end thereof for producing an electron beam directed along a path, a photoemissive cathode in the other end of said envelope, for producing a photoelectron image directed along a path, a target electrode positioned in the path of said electron beam and in the path of said photoelectron image and in said envelope, said target electrode including a first material selected from the group comprising magnesium oxide and aluminum oxide and having a resistivity greater than $10^{11}$ ohm-centimeters, said target further including a sufficient amount of a second material selected from the group consisting of gold, silver, copper, aluminum, titanium, zinc, tin, lead, gallium, selenium, tellurium, germanium, silicon and carbon so that the resistivity of said target is substantially $10^{11}$ ohm-cm., and means for scanning said beam at a conventional scanning rate characterized by a relatively high efficiency when said target has a resistivity of approximately $10^{11}$ ohm-centimeters.

2. A photoemissive pickup tube comprising an evacuated envelope, an electron gun in one end of said envelope for producing an electron beam, a semi-conductive target electrode, means for scanning said beam across said target at a conventional scanning rate, a photoemissive cathode in the other end of said envelope for producing a photoelectron image, means for directing said photoelectron image onto said semi-conductive target electrode, said target electrode having a normal resistivity of not more than $10^{11}$ ohm-cm. for efficient operation at said conventional scanning rate, said semiconducting target being from about 500 to several thousand Angstrom units thick, and said target including magnesium oxide having a resistivity higher than said normal resistivity, said magnesium oxide being doped with silver in sufficient amount to reduce the resistivity of said target to said normal resistivity.

3. A pickup tube comprising an evacuated envelope having an electron gun in one end thereof for producing an electron beam directed along a path, means for scanning said electron beam at a conventional television scanning rate, a photoemissive cathode in the other end of said envelope for producing a photoelectron image directed along a path, and a target electrode positioned in the path of said electron beam and in the path of said photoelectron image and in said envelope, said target electrode comprising a first material selected from the group consisting of aluminum oxide, magnesium oxide and mixtures of magnesium oxide and aluminum oxide, said first material having a resistivity greater than $10^{11}$ ohm-centimeters, and a second material selected from the group consisting of gold, silver, copper, aluminum, titanium, zinc, tin, lead, gallium, selenium, tellurium, germanium, silicon and carbon, the amount of said second material being such as to cause the resistivity of said target to be approximately $10^{11}$ ohm-centimeters, whereby said target operates efficiently at said conventional television scanning rate.

4. A pickup tube comprising an evacuated envelope having an electron gun in one end thereof for producing an electron beam directed along a path, means for scanning said electron beam at a conventional television scanning rate, a photoemissive cathode at the other end of said envelope for producing a photoelectron image directed along a path, and a target electrode in said envelope positioned in the path of said electron beam and in the path of said photoelectron image, said target comprising a material selected from the group consisting of magnesium oxide and aluminum oxide having a resistivity higher than $10^{11}$ ohm-centimeters, said material being doped with an oxidized doping agent for reducing the resistivity of said target to a value not substantially greater than $10^{11}$ ohm-centimeters, said oxidized doping agent being an oxide of a material selected from the group consisting of gold, silver, copper, aluminum, zinc, tin, lead, gallium, selenium, tellurium, germanium, silicon and carbon, whereby said target operates efficiently when said beam is scanned at said conventional television scanning rate.

References Cited by the Examiner

UNITED STATES PATENTS

| | | | |
|---|---|---|---|
| 2,493,539 | 1/50 | Law | 313—89 |
| 2,582,843 | 1/52 | Moore | 313—89 |
| 2,871,086 | 1/59 | Korner et al. | 316—4 |
| 2,887,632 | 5/59 | Dalton | 317—238 |
| 2,922,907 | 1/60 | Hannam | 313—89 X |
| 2,923,585 | 2/60 | Levin | 316—4 |
| 3,069,578 | 12/62 | Hares et al. | 313—89 X |
| 3,090,881 | 5/63 | Wellinger | 313—89 X |

DAVID J. GALVIN, *Primary Examiner.*

ARTHUR GAUSS, BENNETT G. MILLER, *Examiners.*